Patented Dec. 17, 1940

2,225,124

UNITED STATES PATENT OFFICE 2,225,124

TREATMENT OF FATTY COMPOSITIONS AND PRODUCT

George D. Martin, Nitro, W. Va., assignor to Monsanto Chemical Company, St. Louis, Mo., a corporation of Delaware No Drawing. Application November 25, 1938, Serial No. 242,291

17 Claims. (Cl. 23—250)

This invention relates to the stabilization of compositions containing a fatty component and particularly to the prevention of their decomposition or rancidification.

It is well known that oxidizable fatty materials such as soap, and especially white soap, tend to deteriorate upon aging as evidenced by development of color and rancid odor. These obnoxious characteristics are particularly noticeable in the case of soaps made from oils which themselves quickly become rancid, as for example, olive oil, cottonseed oil, palm oil, palm kernel oil, peanut oil and the like. Rancidity and color formation are known to be accelerated by various agents such as heat, sunlight, ultraviolet light and certain metals such as copper. It is obviously desirable to counteract these accelerating agents and the natural tendency of oxidizable fatty materials to deteriorate with age.

Among the objects of the present invention is the inhibiting or retarding the deterioration of oxidizable fatty materials, as for example, vegetable oils and soaps.

Another object of the invention is the preparation of a new and improved vegetable oil or soap.

It has been discovered in accordance with the present invention that thiourethanes are effective stabilizers of oxidizable fatty materials. The thiourethanes comprise the esters of thiocarbamic acids and are conveniently designated by the following structural formula

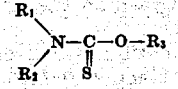

wherein $R_1$ and $R_2$ represent hydrogen, alkyl, aryl, aralkyl and alicyclic groups and $R_3$ represents an ester forming radical as for example alkyl, aryl, aralkyl and alicyclic groups.

Typical examples of the preferred class of stabilizers of oxidizable fatty materials are N-phenyl thiourethane

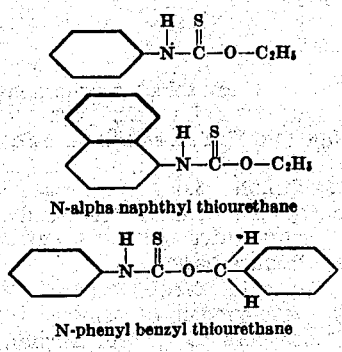

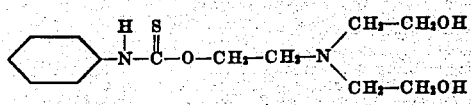

N-phenyl beta (di beta hydroxy ethyl) amino ethyl thiourethane

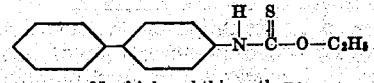

N-p-biphenyl thiourethane

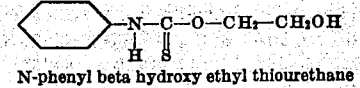

N-phenyl beta hydroxy ethyl thiourethane

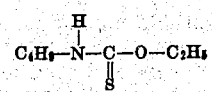

N-butyl thiourethane

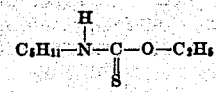

N-amyl thiourethane

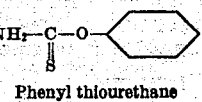

Phenyl thiourethane and analogues and equivalents thereof.

One method for the preparation of thiourethanes is by the action of ammonia or an amine on a xanthic ester although other methods have been described in the chemical literature and may be employed when desired. For example, a mustard oil such as phenyl mustard oil may be reacted with an alcohol or a phenol in the presence of caustic soda to produce a thiourethane. The thiourethanes in general are a well known class of compounds and the present invention is in nowise limited to their preparation.

The following are typical methods employed in testing the preferred materials and are specific embodiments of the invention showing the useful and valuable properties of the preferred class of compounds and are intended to illustrate the invention but in nowise to limit the same.

A substantially neutral soap was prepared by saponifying a mixture of substantially 3 parts by weight of an edible tallow and substantially 1 part by weight of cocoanut oil with sodium hydroxide. Substantially 0.1% based on the weight of the soap of one of the preferred stabilizers was incorporated therein by a suitable means. Five grams of the treated soap were placed in a 250 c. c. iodine flask and a piece of filter paper saturated with water was torn to small pieces and placed in the flask. The flask was then tightly stoppered and placed in an oven maintained at a constant temperature of 50° C. At the end of each day the color of the soap under test was noted, also the stopper was removed, and any odor indicative of rancidity noted. Similar tests were carried out with the same soap to which no stabilizer was added and the periods of stability compared. The period during which the soap containing typical examples of the preferred class of materials did not develop rancidity or substantially discolor is given in the following table.

Table I

| Stabilizing Agent | Stabilizing agent based on the weight of the soap | Period of stability, days |
|---|---|---|
| | Percent | |
| N-phenyl beta (di beta hydroxy ethyl) amino ethyl thiourethane | 0.1 | 16 |
| N-phenyl thiourethane | 0.1 | 30 |
| N-phenyl butyl thiourethane | 0.1 | 33 |
| N-alpha naphthyl thiourethane | 0.1 | 30 |
| N-phenyl benzyl thiourethane | 0.1 | 26 |
| N-phenyl beta hydroxy ethyl thiourethane | 0.1 | 21 |
| N-cyclohexyl thiourethane | 0.1 | 33 |

The period of stability for the identical soap containing no added stabilizer thereof was found on testing in the above described manner to be approximately four days.

From the data hereinbefore set forth it is readily shown that the preferred class of compounds constitute an important class of soap stabilizers.

As further specific embodiments of the present invention a convenient quantity, for example 0.01% to 1.0% by weight of any of the above preferred class of stabilizing agents may be incorporated in fatty acid compounds generally, including oils, such as animal or fish oils or a vegetable oil, for example olive oil. As a means of testing the stabilizing action thereof, the treated oil is heated in an open flask for several days in an oven maintained at 50° C. After various intervals of time samples of the aged oils are tested in a manner analogous to that described by D. H. Wheeler, Oil and Soap, vol. 9, page 93, 1932. Thus five grams of olive oil are dissolved in 50 c. c. of solvent mixture (60 percent of glacial acetic acid, 40 percent of chloroform) and 1 c. c. of saturated potassium iodide solution added. After exactly one minute from the time of the addition of the potassium iodide, 100 c. c. of water are added and the liberated iodine titrated with 0.01 N sodium thiosulfate, employing starch as indicator. The titration in cubic centimeters is a measure of the peroxide formation and consequently a measure of the stability of the oil, a low figure indicating little peroxide formation or in other words good stability. The titration figures obtained on heating the olive oil for different periods of time at 50° C. in the absence of and in the presence of 0.1% by weight of the new class of stabilizing agents is given in Table II.

Table II

| Stabilizing agent | Titration in c. c. N/100 Na₂S₂O₃ after— | | | |
|---|---|---|---|---|
| | 11 days | 38 days | 46 days | 60 days |
| Blank | 55.0 | 122.0 | 156.0 | |
| N-phenyl thiourethane | 3.5 | 2.5 | 2.6 | 1.7 |
| N-phenyl butyl thiourethane | 3.5 | 2.5 | 2.7 | 2.0 |
| N-phenyl benzyl thiourethane | 4.5 | 3.0 | 3.0 | 2.8 |
| N-phenyl beta hydroxy ethyl thiourethane | 4.0 | 2.6 | 3.0 | 2.5 |
| N-cyclohexyl thiourethane | 3.8 | 2.8 | 3.2 | 1.9 |

From the data set forth in Table II it is shown that the preferred class of compounds exhibit exceptional stabilizing properties when incorporated in oxidizable fatty materials, for example vegetable oils.

As further specific embodiments of the invention showing the stabilizing properties of the preferred class of compounds in vegetable oils and in other oxidizable fatty materials, a typical member of the preferred class of materials, for example N-phenyl thiourethane, was tested in oleic acid and in cottonseed oil in the manner described above and found to exhibit desirable stabilizing properties.

The amount of the selected one or mixture of the preferred substances which may be added to the ordinary soap, or soap stock, or ingredients used in the manufacture thereof, for effecting the desired result, may be varied, but in general it will be found that good results may be obtained by adding, upon a weight basis, from 0.01% to 1.0% of the stabilizing agent to the soap or soap stock.

In operating the present invention, the stabilizing agent may be introduced at any stage of the process of soap manufacture. Furthermore, where convenient or desirable the preferred class of stabilizers may be incorporated in the form of an aqueous caustic solution. For example, after the fatty acid has been obtained in the usual manner and has been saponified to produce a soap stock, the products comprising the preferred stabilizers may be incorporated therein. The soap product may then be dried in the usual manner and may be marketed in cakes, flakes, or any other form as may be desired. Further, if desirable, the stabilizing agent may be incorporated into the dry soap in the well known crutching process. Moreover, the stabilizing agent may conveniently be added to the oils, fats or fatty acids before saponification. Again the compounds of the present invention may be employed in conjunction with oxidizable fatty materials including soaps and fatty oils broadly as stabilizers thereof.

Other methods of testing the stability of fatty acid compounds than those specifically disclosed may be employed, as is well known to those skilled in the art to which the present invention pertains.

The present invention is limited solely by the following claims attached hereto as part of the specification.

What is claimed is:

1. An oxidizable fatty material stabilized against the development of color and rancidity by having incorporated therein a small amount of a compound possessing the structure

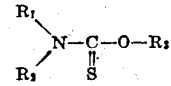

wherein $R_1$ and $R_2$ are selected from a group consisting of hydrogen, alkyl, aryl, aralkyl and alicyclic groups and $R_3$ represents an ester forming group.

2. An oxidizable fatty material stabilized against the development of color and rancidity by having incorporated therein a small amount of an N-aryl thiourethane.

3. An oxidizable fatty material stabilized against the development of color and rancidity by having incorporated therein a small amount of an N-alicyclic thiourethane.

4. An oxidizable fatty material stabilized against the development of color and rancidity by having incorporated therein a small amount of an N-phenyl thiourethane.

5. An oxidizable fatty material stabilized against the development of color and rancidity by having incorporated therein a small amount of an N-cyclohexyl thiourethane.

6. An oxidizable fatty material stabilized against the development of color and rancidity by having incorporated therein a small amount of a thiourethane wherein the ester forming radical is an alkyl group containing more than two carbon atoms.

7. An oxidizable fatty material stabilized against the development of color and rancidity by having incorporated therein a small amount of an N-phenyl alkyl thiourethane wherein the said alkyl group contains more than two carbon atoms.

8. A soap stabilized against the development of color and rancidity by having incorporated therein a small amount of a compound possessing the structure

wherein $R_1$ and $R_2$ are selected from a group consisting of hydrogen, alkyl, aryl, aralkyl and alicyclic groups and $R_3$ represents an ester forming group.

9. A soap stabilized against the development of color and rancidity by having incorporated therein a small amount of an N-aryl thiourethane.

10. A soap stabilized against the development of color and rancidity by having incorporated therein a small amount of an N-alicyclic thiourethane.

11. A soap stabilized against the development of color and rancidity by having incorporated therein a small amount of an N-phenyl thiourethane.

12. A soap stabilized against the development of color and rancidity by having incorporated therein a small amount of an N-cyclohexyl thiourethane.

13. A soap stabilized against the development of color and rancidity by having incorporated therein a small amount of a thiourethane wherein the ester forming radical is an alkyl group containing more than two carbon atoms.

14. A soap stabilized against the development of color and rancidity by having incorporated therein a small amount of an N-phenyl alkyl thiourethane wherein the said alkyl group contains more than two carbon atoms.

15. A soap stabilized against the development of color and rancidity by having incorporated therein a small amount of N-phenyl thiourethane.

16. A soap stabilized against the development of color and rancidity by having incorporated therein a small amount of N-phenyl butyl thiourethane.

17. A soap stabilized against the development of color and rancidity by having incorporated therein a small amount of N-cyclohexyl thiourethane.

GEORGE D. MARTIN.